United States Patent [19]

Watanabe

[11] 4,219,839

[45] Aug. 26, 1980

[54] AMPLITUDE COMPARATOR WITH A DIFFERENTIAL AMPLIFIER

[75] Inventor: Yasuaki Watanabe, Yokohama, Japan

[73] Assignee: Victor Company of Japan Limited, Yokohama, Japan

[21] Appl. No.: 912,715

[22] Filed: Jun. 5, 1978

[30] Foreign Application Priority Data

Jun. 6, 1977 [JP] Japan .......................... 52/72585[U]

[51] Int. Cl.² ...................... H03K 1/14; H04N 9/537
[52] U.S. Cl. ................................ 358/27; 307/351; 307/360; 307/362; 330/280; 358/40
[58] Field of Search ............. 307/351, 354, 360, 362; 330/252, 256, 258, 261, 280; 358/19, 20, 27, 176, 40

[56] References Cited

U.S. PATENT DOCUMENTS

| | | | |
|---|---|---|---|
| 3,566,296 | 2/1971 | Liu | 330/261 X |
| 3,585,510 | 6/1971 | O'Malley | 307/362 X |
| 3,757,137 | 9/1973 | Ahmed | 307/362 |

Primary Examiner—John Zazworsky
Attorney, Agent, or Firm—Lowe, King, Price and Becker

[57] ABSTRACT

An input signal is coupled via a capacitor to a base of a transistor which constitutes a differential amplifier with another transistor. The base of the transistors are respectively fed with first and second predetermined voltages via a pair of transistors so that the differential amplifier produces an output signal proportional to the difference between the peak value of the input signal and a predetermined value only when the peak to peak value of the input signal exceeds a predetermined voltage.

16 Claims, 8 Drawing Figures

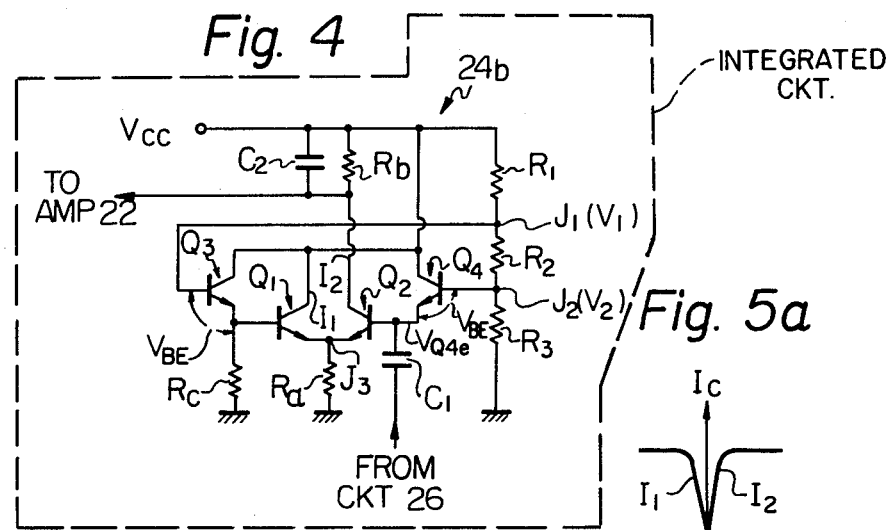
*Fig. 4*
*Fig. 5a*
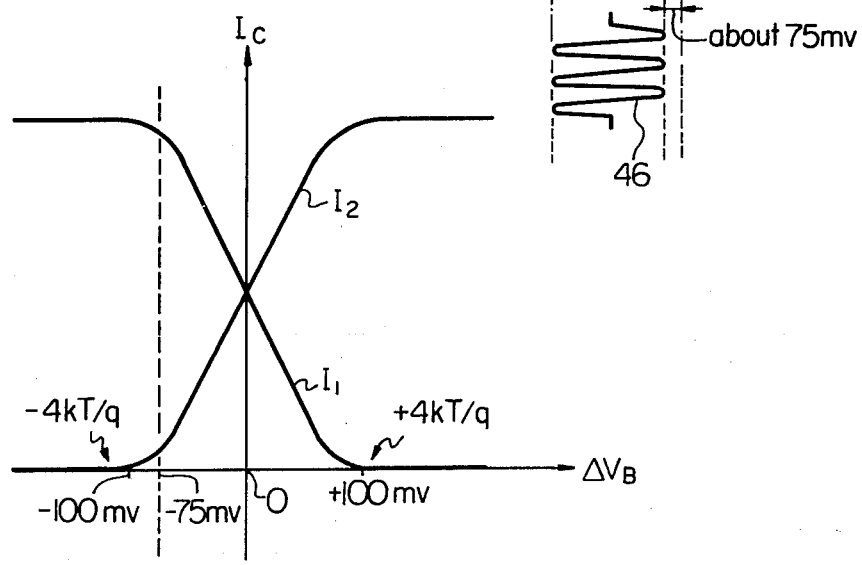
*Fig. 5b*

AMPLITUDE COMPARATOR WITH A DIFFERENTIAL AMPLIFIER

FIELD OF THE INVENTION

This invention generally relates to an amplitude comparator. More specifically the present invention relates to a comparator adaptable to be used in an ACC (automatic chrominance control) circuit for a television, wherein the comparator is utilized for comparing the amplitude of a color burst signal with a reference voltage.

BACKGROUND OF THE INVENTION

In a color television receiver, an ACC circuit is usually employed in order to reproduce colors in a reliable manner. It is necessary to produce three color difference signals by a luminance signal and two signals obtained by demodulation of a chrominance signal. Since the chrominance signal is apt to be influenced by the condition of the propagation of the radio waves and the deterioration of the TV set, the amplitude of the chrominance signal may vary with respect to a predetermined value. Since the amplitude of a chrominance signal is usually different among a plurality of radio waves, a channel change is likely to produce a variation causing a TV set to reproduce unstable picutre colors. The ACC circuit contemplates eliminating the influence of the fluctuation of the chrominance signal for obtaining a stable color picture.

As well known, an ACC circuit for a TV receiver, includes a gain controllable amplifier, a burst-signal gate circuit, an amplitude comparator and an amplifier. The comparator is utilized for producing an output signal the magnitude of which is in proportion to the difference between the peak value of the burst signal and a predetermined value only when the peak to peak value of the burst signal is over a predetermined value.

In a conventional comparator, the burst signal is applied to a cathode of a diode via a capacitor wherein the cathode of the diode is connected to a base of a transistor the emitter of which is connected to ground and the anode of the diode is connected to ground. With this arrangement, when the peak to peak value of the burst signal is over a voltage expressed by $V_D + V_{BE}$, wherein $V_D$ is a forward voltage of the diode and $V_{BE}$ is a forward voltage across the base and the emitter of the transistor, the transistor becomes conductive. However, the values of $V_D$ and $V_{BE}$ of the diode and the transistor respectively have variations because of mass production. Therefore, the value of $V_D + V_{BE}$ can not be set at a predetermined value. Moreover, the value of $V_D$ and $V_{BE}$ are apt to be influenced by the variation of the ambient temperature. Consequently, in a conventional type of comparator, the magnitude of the output signal of the comparator varies in accordance with the variation of the ambient temperature. Although the variation of the values $V_D$ and $V_{BE}$ among a plurality of comparators can be compensated for by adjusting the amplification degree of an amplifier responsive to the gain controllable amplifier, the variation due to the temperature variation is inherent to the conventional comparator.

SUMMARY OF THE INVENTION

The present invention has been achieved to overcome the above mentioned drawbacks of the conventional type of an amplitude comparator adaptable to be used in an ACC circuit of a television receiver.

According to the present invention, a differential amplifier having at least four transistors is provided to function as a comparator in which inherent voltages such a $V_{BE}$ (forward voltage across the base and emitter of a transistor) do not influence the output voltage of the comparator. Two predetermined voltages are fed to bases of two transistors so that the comparator produces an output signal only when the magnitude of the input burst signal exceeds a voltage which is slightly smaller than the difference between the two predetermined voltages.

Therefore, it is an object of the present invention to provide an improved comparator adaptable to be used in an ACC curcuit of a television receiver in which the output signal of the comparator is not influenced by the variation of forward voltages across semiconductor elements.

BRIEF DESCRIPTION OF THE DRAWINGS

The object and features of the present invention will become readily apparent from the following detailed description taken in conjunction with the accompanying drawings in which:

FIG. 4 is a first preferred embodiment of the comparator according to the present invention;

FIG. 5a is a chart of the relationship between the voltage of the burst signal and the collector currents of the transistors shown in FIG. 4;

FIG. 5b is an enlarged detail of the collector currents shown in FIG. 5a;

DETAILED DESCRIPTION OF THE PREFERRED EMBODIMENTS

Figure 1:
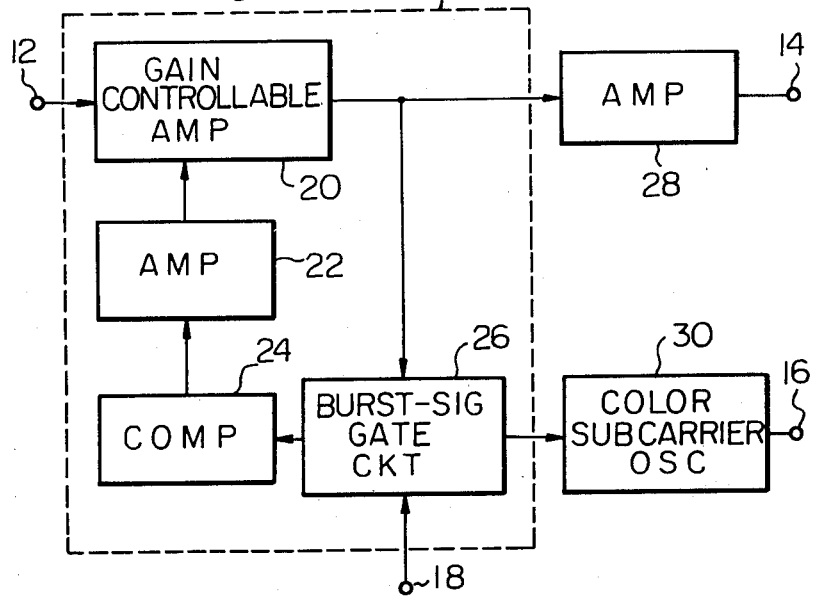
FIG. 1 is in a block diagram of an ACC circuit in which the comparator according to the present invention is utilized.

FIG. 1 is a block diagram of a conventional ACC (automatic chrominance control) circuit which is utilized for a color television receiver. The ACC circuit 10 includes a gain controllable amplifier 20, a burst signal gate circuit 26, an amplitude comparator 24, and an amplifier 22. A chrominance signal is fed to the input of the gain controllable amplifier via a terminal 12. The chrominance signal is thus amplified and then fed to an input of an amplifier 28 and to an input of the burst signal gate circuit 26. A burst gate signal is applied to another input of the burst signal gate circuit 26 via a terminal 18. A burst signal included in the amplified chrominance signal is then separated from the same in synchronization with the burst gate signal. The burst signal derived from the chrominance signal is then fed to an input of the comparator 24 and to an input of a color subcarrier oscillator 30. An output signal of the color subcarrier oscillator 30 is fed to a next stage of the television receiver via a terminal 16.

The comparator 24 is arranged to produce an output signal in accordance with the peak value of the burst signal only when the peak to peak value of the burst signal is over a predetermined value. The output of the comparator 24 is fed via an amplifier 22 to a control terminal (no numeral) of the gain controllable amplifier 20. Consequently, the degree amplification of the gain controllable amplifier 20 is regulated in accordance with the output signal of the comparator 24. Since circuits 20 to 26 inclusive constitute a closed loop circuit, the amplitude of the signal of the gain controllable amplifier 20 is so controlled that the amplitude of the burst signal included therein assumes a predetermined value. With this arrangement, a chrominance signal having a constant magnitude burst signal is supplied to a next stage of the color television receiver via the amplifier 28 and the terminal 14. The detailed circuit of the comparator 24 according to the present invention is described infra.

Prior to the description of the preferred embodiments of the comparator according to the present invention, a discussion of the prior art comparator is presented.

Figure 2:
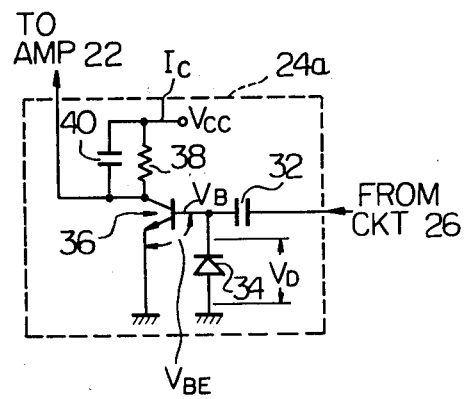
FIG. 2 is a conventional type of a comparator utilized for an ACC circuit.

FIG. 2 is an illustration of a detailed circuit of a conventional comparator 24a utilized for the comparator 24 of the ACC circuit 10 shown in FIG. 1. The comparator 24a includes a first and second capacitors 32 and 40, a diode 34, a transistor 36, and a resistor 38. One terminal of the first capacitor 32 is connected to the cathode of the diode 34 and to the base of the transistor 36 while the other terminal of the first capacitor 32 is connected to the output of the burst signal gate circuit 26 shown in FIG. 1. The anode of the diode 34 is grounded. The collector of the transistor 36 is connected via a parallel circuit of the second capacitor 40 and the resistor 38 to a positive power supply Vcc while the emitter of the transistor is grounded. The collector of the transistor 36 is further connected to the input of the amplifier 22 shown in FIG. 1.

Figure 3:
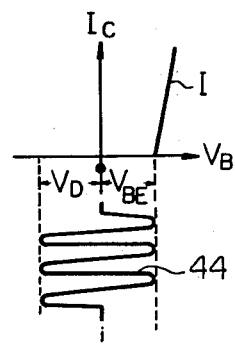
FIG. 3 is a chart in which the relationship between the voltage of the burst signal and the collector current of the transistor shown in FIG. 2 is shown.

As well known, the first capacitor 32 and the diode 34 constitute a clamping circuit (no numeral). Therefore, when a burst signal 44 shown in FIG. 3 is applied to the input terminal of the first capacitor 32, the negative peak value of the burst signal 44 is clamped at a negative level which equals the forward voltage $V_D$ of the diode 34. The clamped burst signal across the diode 34 is then applied across the base and the emitter of the transistor 36. With this provision, when the positive peak value of the clamped burst signal exceeds the forward voltage $V_{BE}$ between the base and the emitter of the transistor 36, the transistor 36 becomes conductive. In other words, when the peak to peak value of the burst signal exceeds a voltage expressed by $V_D+V_{BE}$, the transistor 36 becomes conductive. Therefore, a collector current Ic flows via a load resistor 38 in response to a base voltage $V_B$ greater than $V_{BE}$. A line I shown in FIG. 3 is the relationship between the base voltage $V_B$ and the collector current Ic. The second capacitor 40 connected in parallel with the load resistor 38 smoothes the output voltage across the load resistor 38. With this arrangement, the output voltage across the load resistor 38 varies, only when the peak to peak value of the supplied burst signal exceeds the voltage expressed by $V_D+V_{BE}$, in accordance with the difference between the peak voltage of same and a predetermined voltage which is equal to $V_{BE}$. The output voltage is then fed to the input of the amplifier 22 shown in FIG. 1. When the amplification degree of the burst signal gate circuit 26 is 1, the peak to peak value of the burst signal included in the output chrominance signal of the gain controllable amplifier 20 equals the voltage expressed by $V_D+V_{BE}$ by means of a feedback control.

Although the conventional comparator 24a shown in FIG. 2 has the advantage of being simple in construction, it has drawbacks as mentioned hereinbefore. Namely, the output voltage of the comparator 24a is not constant due to the semiconductor elements having forward voltage variations which occur because of the mass production and/or the variation of the ambient temperature.

Assuming the semiconductor elements, i.e. the diode 34 and the transistor 36 are formed integrally on the IC chip, the forward voltages $V_D$ and $V_{BE}$ thereof are equal to each other. If each of the forward voltages is 0.7 volt, the peak to peak value of the burst signal included in the output chrominance signal of the gain controllable amplifier 20 is 1.4 volts. The variation of the forward voltages of semiconductor elements due to mass production is usually within a range of $\pm 0.05$ volts. If the forward voltages $V_D$ and $V_{BE}$ of the diode 34 and the transistor 36 vary within the range of $\pm 0.05$ volts, variation of the peak to peak value of the burst signal included in the output chrominance signal of the gain controllable amplifier 20 is within a range of $\pm 0.1$ volts. This range of $\pm 0.1$ volts corresponds to $\pm 7\%$ of the peak to peak value which is 1.4 volts as mentioned before.

On the other hand, as is well known, the forward voltage of a semiconductor element varies at a rate of $-2$ milli volts per degree centigrade. Since circuits used in domestic apparatus, such as a color TV, operate within a range of $\pm 50°$ C. with respect to the normal temperature (25° C.), the forward voltages vary within a range of $\mp 0.1$ volts. Therefore, the variation of the peak to peak value of the burst signal included in the output chrominance signal of the gain controllable amplifier 20 is within a range of $\mp 0.2$ volts. This range of $\mp 0.2$ volts corresponds to $\mp 14\%$ of the peak to peak value.

From the foregoing, it will be understood that the influence of the variation of the forward voltages of semiconductor elements, such as the diode 34 and the transistor 36, is considerably large.

Reference is now made to FIG. 4, a circuit diagram of a a first preferred embodiment of the comparator according to the present invention. The comparator 24b includes six resistors R1, R2, R3, Ra, Rb, and Rc, two capacitors C1 and C2, and four transistors Q1 to Q4. Three series connected resistors R1, R2 and R3 are interposed between a positive power supply Vcc and ground. A first junction J1 between resistors R1 and R2 is connected to the base of the third transistor Q3 while a second junction J2 between resistors R2 and R3 is connected to the base of the fourth transistor Q4. The collectors of the third and fourth transistors Q3 and Q4 are connected to each other and are connected to the positive power supply Vcc. The emitter of the third transistor Q3 is connected to the base of the first transistor Q1 and is connected via the resistor Rc to ground. The emitter of the fourth transistor is connected to the base of the second transistor Q2 and is connected via a first capacitor C1 to the output of the burst signal gate circuit 26 shown in FIG. 1. The emitters of the first and second transistors Q1 and Q2 are connected to each other and are connected via the resistor Ra to ground. The collector of the first transistor Q1 is connected to the positive power supply Vcc while the collector of the second transistor Q2 is connected via the parallel combination of the resistor Rb and the second capacitor C2 to the positive power supply. The collector of the second transistor Q2 is further coupled to the input of the amplifier 22 shown in FIG. 1.

The third transistor Q3 and the resistor Rc constitute an emitter follower circuit in which the voltage across the resistor Rc is fed to the base of the first transistor Q1. Resistors R1, R2 and R3 constitute a voltage divider in which two predetermined voltages V1 and V2 are obtained at the first and second junctions J1 and J2 thereof. It is apparent that the first predetermined voltage V1 is higher than the second predetermined voltage V2. Accordingly, the voltage at the base of the third transistor Q3 is greater than the voltage at the base of the fourth transistor Q4 as much as the voltage across the resistor R2. Therefore, the voltage at the base of the first transistor Q1 is higher than the voltage at the base of the second transistor Q2 in the same manner since the bases of the first and second transistors Q1 and Q2 are respectively coupled to the emitters of the third and fourth transistors Q3 and Q4. The voltage difference $\Delta V_B$ between the bases of the first and second transistors Q1 and Q2 is obtained by subtracting the base voltage of the first transistor Q1 from that of the second transistor Q2.

The collector currents I1 and I2 of the first and second transistors Q1 and Q2 are plotted with respect to the voltage difference $\Delta V_B$ in FIG. 5a. Currents I1 and I2 vary symmetrically with respect to the vertical axis of FIG. 5a, where $\Delta V_B$ is zero. Since the first and second transistors Q1 and Q2 constitute a differential amplifier wherein the emitters of the first and second transistors are connected to each other and to ground via the resistor Ra, the sum of the first and second collector currents I1+I2 is constant. Therefore, when the second collector current I2 starts to flow, the first collector current I1 starts decrease. The amplitude of the first and second collector currents I1 and I2 are the same when the voltage difference $\Delta V_B$ is zero as shown.

FIG. 5b is an enlarged detail of the first and second collector currents I1 and I2 shown in FIG. 5a. As well known, the second collector current I2 starts to flow when the voltage difference $\Delta V_B$ is greater than a predetermined voltage expressed by $-\kappa T/q$ wherein $\kappa$ is the Boltzmann constant ($1.38 \times 10^{-23}$ J/°K.), T is the junction temperature of the second transistor Q2 in degrees Kelvin, and q is the charge of an electron ($1.6 \times 10^{-19}$ C). The value of $-4\kappa T/q$ at the normal temperature (25° C.) is about $-103$ milli volts. The second collector current I2 increases exponentially as well known. Therefore, when the voltage difference $\Delta V_B$ is slightly greater than the value $-4\kappa T/q$, the value of the second collector current I2 is negligible. When the voltage difference $\Delta V_B$ exceeds about $-75$ milli volts, a substantial second collector current I2 flows via the load resistor Rb. In other words, although the collector current theoretically begins to rise along the voltage difference axis $\Delta V_B$ at $-\kappa T/q$, the substantial collector current begins to rise at about $-75$ milli volts along the same $\Delta V_B$.

The input burst signal 46, such as shown in FIG. 5a, is applied via the first capacitor C1 to the base of the second transistor Q2 and to the emitter of the fourth transistor Q4 wherein the negative peak value of the burst signal is clamped at a voltage $V_{Q4e}$, the emitter voltage of the fourth transistor Q4. The emitter voltage $V_{Q4e}$ is expressed by $V2 - V_{BE}$ wherein $V_{BE}$ is the forward voltage across the base and the emitter of the fourth transistor Q4. Assuming the base voltages of the first and second transistors Q1 and Q2 as $V_{B1}$ and $V_{B2}$, the voltage difference $\Delta V_B$ between $V_{B1}$ and $V_{B2}$ is expressed by the following equation:

$$\Delta V_B = V_{B2} - V_{B1} = V2 - V_{BE} - (V1 - V_{BE}')$$

wherein $V_{BE}'$ is a forward voltage across the base and emitter of the first transistor Q1.

Since $V_{BE}'$ corresponds to $V_{BE}$, viz. the two values are substantially equal to each other, the above equation can be simplified as:

$$\Delta V_B = V2 - V1$$

It is to be noted that although $V_{BE}$ and $V_{BE}'$ vary in accordance with the ambient temperature, the degree variation of of the forward voltages $V_{BE}$ and $V_{BE}'$ is the same when two transistors Q4 and Q3 are formed on an IC chip.

From the foregoing it will be understood that the second collector current I2 flows through load resistor Rb only when the peak to peak value of the input burst signal 46 exceeds a predetermined voltage expressed by: $V1 - V2 - 75$ milli volts as shown in FIG. 5a. Therefore, when the peak to peak value of the burst signal 46 exceeds the predetermined voltage, the difference between the peak value of the burst signal and the predetermined voltage is proportionately amplified and thus an amplified voltage derived across the load resistor Rb is fed to the input of the amplifier 22 shown in FIG. 1.

Although the value expressed by $-4\kappa T/q$ is a function of temperature, the value varies within a small range of $\pm 17$ milli volts when the ambient temperature varies within a range of $\pm 50°$ C. with respect to the normal temperature. Therefore, if $\Delta V_B$, i.e. $V2 - V1$, is considerably larger than the value of $4\kappa T/q$ in absolute values, the variation of the value of $-4\kappa T/q$ in accordance with temperature variation is negligible. The value of $\Delta V_B$, therefore, should be set at a relatively large value with respect to $-4\kappa T/q$ in absolute values, such as an order of 1 volt. In order to obtain such a predetermined value of $\Delta V_B$ the ratio of the resistances of the resistors R1, R2 and R3 is suitably selected.

The purpose of using the third transistor Q3 is to provide an element which corresponds to the fourth transistor Q4 interposed between the second junction J2 and the second transistor Q2. With this arrangement, the first to fourth transistors Q1 to Q4 constitute a differential type amplifier. Because of the differential type amplifier, the comparator 24b shown in FIG. 4 functions as an accurate detector irrespective of the variation of the voltage $V_{BE}$ across the base and emitter of transistors Q1 to Q4, which occurs due to ambient temperature variations and mass production.

The first and second predetermined voltages V1 and v2 are derived from the voltage divider including three resistors R1, R2 and R3 as mentioned before. It is advantageous to obtain the predetermined voltages in this manner since such a voltage divider is readily formed on an IC (integrated circuit) chip. The variations of the predetermined voltages on the IC are very small since the ratio between resistances of resistors formed on an IC chip usually have a high accuracy such as $\pm 3\%$ of the rated ratios.

Figure 6:
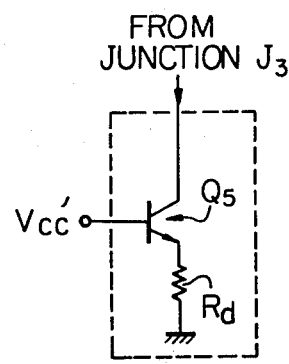
FIG. 6 is a partial circuit diagram of a variation of the first preferred embodiment shown in FIG. 4.

Reference is now made to FIG. 6, a circuit diagram of variation of the first preferred embodiment shown in FIG. 4. The circuit shown in FIG. 6 is a constant-current circuit including a transistor Q5 and a resistor Rd interposed between the emitter of a transistor Q5 and ground. The base of the transistor Q5 is connected to a predetermined potential supply Vcc' while the transistor collector is connected to the third junction J3 shown in FIG. 4. The constant-current circuit is interposed between the third junction J3 and ground instead of the resistor Ra shown in FIG. 4. The constant-current circuit renders the differential amplifier shown in FIG. 4 stable in operation.

Figure 7:
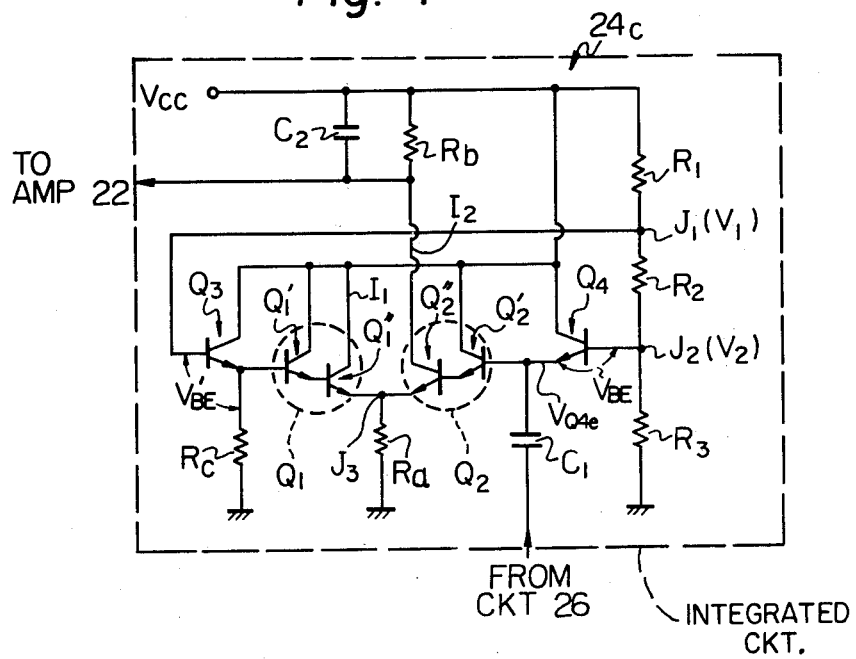
FIG. 7 is circuit diagram of a second preferred embodiment of the comparator according to the present invention.

FIG. 7 is an illustration of a second preferred embodiment of the comparator according to the present invention. The comparator 24c is the same in construction as the comparator 24b shown in FIG. 4 except that a pair of transistors Q1' and Q1" which are connected to each other with a Darlington connection are utilized instead of the first transistor Q1 while another pair of transistors Q2' and Q2" are utilized instead of the second transistor Q2. The collectors of transistors Q1', Q1" and Q2' are connected to the positive power supply Vcc, with the same elements being designated by like references as in FIG. 4. The bases of transistors Q1' and Q2' are respectively connected to the emitters of the third and fourth transistors Q3 and Q4. The emitters of the transistors Q1' and Q2' are respectively connected to the bases of the transistors Q1" and Q2" the emitters of which are connected to each other and further to the junction J3. The collector of the transistor Q2" is connected via the load resistor Rb to the positive power supply Vcc. As well known when a plurality of transistors are connected in series as shown in FIG. 7, the detection sensitivity of an input signal increases by the improvement of CMR (common mode rejection ratio). If desired more transistors can be connected respectively, with a darlington connection, to the transistors Q1' and Q2' in the same manner.

The resistor Ra shown in FIG. 7 may be also substituted for the constant-current circuit shown in FIG. 6 in the same manner as in the first embodiment.

From the foregoing, it will be clearly understood that the comparator according to the present invention functions regardless of variations of the forward voltages of semiconductor elements so as to provide an accurate amplified output signal in accordance with the input burst signal whereby the ACC circuit shown in FIG. 1 including the comparator 24 produces an output chrominance signal including the burst signal the magnitude of which is constant.

Although the comparator according to the present invention is described in conjunction with an ACC circuit for a television receiver, the concept of the improved comparator may be adopted to various comparators utilized in many fields.

What is claimed is:

1. An amplitude comparator for producing an output signal proportional to the difference between the peak value of an input signal and a predetermined voltage only when the peak to peak value of the input signal is over a predetermined voltage, comprising:
    a differential amplifier including first and second transistors having emitters connected to each other, and an impedance element connecting the emitters to ground, said first transistor having a collector connected to a power supply terminal;
    means for providing first and second predetermined voltages;
    an emitter follower circuit including a third transistor having a base supplied with said first predetermined voltage, and a collector connected to said power supply terminal, said third transistor having an emitter connected to the base of said first transistor;
    a fourth transistor having a base supplied with said second predetermined voltage, said fourth transistor having an emitter connected to a base of said second transistor, said fourth transistor having a collector connected to said power supply terminal;
    a series capacitor connected to the base of said second transistor for coupling the input signal to the base of said second transistor;
    a load resistor connected to the collector of said second transistor, an output signal being derived across the load resistor; and
    said first and second predetermined voltages being selected so that when the peak to peak value of said input signal is below a predetermined value said second transistor becomes nonconductive and said first transistor becomes conductive.

2. An amplitude comparator for producing an output signal proportional to the difference between the peak value of an input signal and a predetermined voltage only when the peak to peak value of the input signal is over a predetermined voltage, comprising:
    a differential amplifier including first and second transistors having emitters connected to each other, and an impedance element connecting the emitters to ground, said first transistor having a collector connected to a power supply terminal;
    a third transistor having an emitter connected to a base of said first transistor and a collector connected to the collector of said first transistor;
    a fourth transistor having an emitter connected to a base of said second transistor and a collector of said fourth transistor connected to said power supply terminal;
    means for providing first and second predetermined voltages;
    an emitter follower including a fifth transistor having a base supplied with said first predetermined voltage, and a collector connected to said power supply terminal, said fifth transistor having an emitter connected to the base of said third transistor;
    a sixth transistor having a base supplied with said second predetermined voltage and an emitter connected to the base of said fourth transistor, said sixth transistor having a collector connected to said power supply terminal;
    a series capacitor connected to the base of said fourth transistor for coupling the input signal to the base of the fourth transistor;
    a load resistor connected between the collector of said second transistor and said power supply terminal, an output signal being derived across said load resistor; and
    said first and second predetermined voltages being selected so that when the peak to peak value of said input signal is below a predetermined value said second transistor becomes nonconductive and said first transistor becomes conductive.

3. An amplitude comparator as claimed in claim 2, further comprising at least two transistors respectively connected in Darlington connections to said third and fourth transistors.

4. An amplitude comparator as claimed in claim 1 or 2 or 3, wherein said impedance element comprises a constant-current circuit.

5. An amplitude comparator as claimed in claim 1 or 2 or 3, wherein said means for providing first and second predetermined voltages comprises a voltage divider including at least three resistors formed on an integrated circuit chip.

6. An amplitude comparator as claimed in claim 1 or 2 or 3, wherein said transistors are formed on an integrated circuit chip.

7. An amplitude comparator as claimed in claim 1 or 2, wherein the voltage difference between said first and second predetermined voltages is sufficiently greater than a voltage expressed by 4κT/q such that the variation of the voltage expressed by 4κT/q in accordance with the temperature variation is negligible where κ is the Boltzmann constant, T is the junction temperature degrees absolute of the second transistor, and q is the charge of an electron.

8. An amplitude comparator as claimed in claim 5, wherein the resistances of said resistors of said voltage divider are selected so that the voltage difference is absolute value between said first and second predetermined voltages is sufficiently greater than a voltage expressed by 4κT/q such that the variation of the voltage expressed by 4κT/q in accordance with the temperature variation is negligible, where κ is the Boltzmann constant, T is the junction temperature degrees absolute of the second transistor and q is the charge of an electron.

9. An automatic chrominance control circuit comprising:
   (a) a gain controllable amplifier responsive to a chrominance signal;
   (b) a burst signal gate circuit for separating a burst signal from the output signal of said gain controllable amplifier in response to a burst gate signal;
   (c) an amplitude comparator for producing an output signal proportional to the difference between the peak to peak value of said burst signal and a predetermined voltage only when the peak to peak value of said burst signal is over a predetermined voltage, said amplifier comparator including:
   a differential amplifier including first and second transistors having emitters connected to each other, and an impedance element connecting the emitters to ground, said first transistor having a collector connected to a power supply terminal;
   means for providing first and second predetermined voltages;
   an emitter follower circuit including a third transistor having a base supplied with said first predetermined voltage, and a collector connected to said power supply terminal, said third transistor having an emitter connected to the base of said first transistor;
   a fourth transistor having a base supplied with said second predetermined voltage, said fourth transistor having an emitter connected to a base of said second transistor, said fourth transistor having a collector connected to said power supply terminal;
   a series capacitor connected to the base of said second transistor for coupling said burst signal to the base of said second transistor;
   a load resistor connected to the collector of said second transistor, an output signal being derived across the load resistor;

said first and second predetermined voltages being selected so that when the peak value of said burst signal is below a predetermined value said second transistor becomes nonconductive and said first transistor becomes conductive; and
   (d) an amplifier responsive to the output signal of said amplitude comparator, the output signal of said amplifier being fed to said gain controllable amplifier to control the gain of said chrominance signal in accordance with the same.

10. An automatic chrominance control circuit comprising:
   (a) a gain controllable amplifier responsive to a chrominance signal;
   (b) a burst signal gate circuit for separating a burst signal from the output signal of said gain controllable amplifier in response to a burst gate signal;
   (c) an amplitude comparator for producing an output signal proportional to the difference between the peak to peak value of said burst signal and a predetermined voltage only when the peak to peak value of said burst signal is over a predetermined voltage, said amplitude comparator including:
   a differential amplifier including first and second transistors having emitters connected to each other, and an impedance element connecting the emitters to ground, said first transistor having a collector connected to a power supply terminal;
   a third transistor having an emitter connected to a base of said first transistor and a collector connected to the collector of said first transistor;
   a fourth transistor having an emitter connected to a base of said second transistor and a collector of said fourth transistor connected to said power supply terminal;
   means for providing first and second predetermined voltages;
   an emitter follower including a fifth transistor having a base supplied with said first predetermined voltage, and a collector connected to said power supply terminal, said fifth transistor having an emitter connected to the base of said third transistor;
   a sixth transistor having a base supplied with said second predetermined voltage and an emitter connected to the base of said fourth transistor, said sixth transistor having a collector connected to said power supply terminal;
   a series capacitor connected to the base of said fourth transistor for coupling said burst signal to the base of the fourth transistor;
   a load resistor connected between the collector of said second transistor and said power supply terminal, an output signal being derived across said load resistor;
   said first and second predetermined voltages being selected so that when the peak to peak value of said burst signal is below a predetermined value said second transistor becomes nonconductive and said first transistor becomes conductive; and
   (d) an amplifier responsive to the output signal of said amplitude comparator, the output signal of said amplifier being fed to said gain controllable amplifier to control the gain of said chrominance signal in accordance with the same.

11. In a color visual display system having an automatic chrominance control circuit, an amplitude comparator for producing an output signal proportional to the difference between the peak value of an input signal and a predetermined voltage only when the peak to peak value of the input signal is over a predetermined voltage, comprising:
- a differential amplifier including first and second transistors having emitters connected to each other, and an impedance element connecting the emitters to ground, said first transistor having a collector connected to a power supply terminal;
- means for providing first and second predetermined voltages;
- an emitter follower circuit including a third transistor having a base supplied with said first predetermined voltage, and a collector connected to said power supply terminal, said third transistor having an emitter connected to the base of said first transistor;
- a fourth transistor having a base supplied with said second predetermined voltage, said fourth transistor having an emitter connected to a base of said second transistor, said fourth transistor having a collector connected to said power supply terminal;
- a series capacitor connected to the base of said second transistor for coupling the input signal to the base of said second transistor;
- a load resistor connected to the collector of said second transistor, an output signal being derived across the load resistor; and
- said first and second predetermined voltages being selected so that when the peak to peak value of said input signal is below a predetermined value said second transistor becomes nonconductive and said first transistor becomes conductive.

12. In a color visual display system having an automatic chrominance control circuit, an amplitude comparator for producing an output signal proportional to the difference between the peak value of an input signal and a predetermined voltage only when the peak to peak value of the input signal is over a predetermined voltage, comprising:
- a differential amplifier including first and second transistors having emitters connected to each other, and an impedance element connecting the emitters to ground, said first transistor having a collector connected to a power supply terminal;
- a third transistor having an emitter connected to a base of said first transistor and a collector connected to the collector of said first transistor;
- a fourth transistor having an emitter connected to a base of said second transistor and a collector of said fourth transistor connected to said power supply terminal;
- means for providing first and second predetermined voltages;
- an emitter follower including a fifth transistor having a base supplied with said first predetermined voltage, and a collector connected to said power supply terminal, said fifth transistor having an emitter connected to the base of said third transistor;
- a sixth transistor having a base supplied with said second predetermined voltage and an emitter connected to the base of said fourth transistor, said sixth transistor having a collector connected to said power supply terminal;
- a series capacitor connected to the base of said fourth transistor for coupling the input signal to the base of the fourth transistor;
- a load resistor connected between the collector of said second transistor and said power supply terminal, an output signal being derived across said load resistor; and
- said first and second predetermined voltages being selected so that when the peak to peak value of said input signal is below a predetermined value said second transistor becomes nonconductive and said first transistor becomes conductive.

13. A circuit for amplifying an AC component of an input waveform only in response to the AC component having a peak to peak variation greater than a predetermined level, said circuit amplifying said component despite variations of circuit parameters due to semiconductor elements of the circuit being subject to relatively wide temperature variations, comprising first, second, third and fourth like conductivity type transistors, each having an emitter, base and collector, the first and second transistors being connected as a differential amplifier so that the emitters thereof have a common connection, a DC path including a first impedance element between the common connection and a DC reference potential, means for only AC coupling the waveform to the base of one of the transistors of the differential amplifier, a load impedance connected between the collector of one of the transistors of the differential amplifier and a DC power supply terminal at a DC potential higher than the reference potential, a first DC bias connection between the emitter of the third transistor and the base of one of the transistors of the differential amplifier, a second DC bias connection between the emitter of the fourth transistor and the base of the other transistor of the differential amplifier, and means for supplying DC energizing potentials to the emitter collector paths of all of said transistors, means for supplying different DC forward bias voltages to the bases of the third and fourth transistors, the DC forward bias voltages differing from each other by an amount equal to the predetermined level plus a predetermined value, the predetermined value being substantially less than the maximum voltage difference between the bases of the first and second transistors which is required to enable both of the first and second transistors to conduct simultaneously for normal operating temperature of the circuit, so that, even if variations in the normal operating temperature of the circuit occur, current flows in the load impedance when the peak to peak variation exceeds the predetermined level to provide amplification of the AC component and tendencies of the differential amplifier to prevent amplification of the AC component when the variation exceeds the predetermined level when the temperature variations occur are overcome, the DC bias connections between the emitters and bases of the first, second, third and fourth transistors and the values of the differing DC forward bias voltages being such that the maximum value of the AC component is clamped to the transistor emitter having the DC bias connection to the base of the transistor of the differential amplifier to which the waveform is AC coupled.

14. An automatic chrominance control circuit for a domestic color television receiver subject to normal temperature variations in a domestic environment, said circuit comprising:
(a) a gain controllable amplifier responsive to a chrominance signal;
(b) a burst signal gate circuit for separating a burst signal from the output signal of said gain controllable amplifier in response to a burst gate signal;

(c) an amplitude comparator for producing an output signal proportional to the difference between the peak to peak value of said burst signal and a predetermined voltage only when the peak to peak value of said burst signal is over a predetermined voltage, said amplitude comparator including:

first, second, third and fourth like conductivity type transistors, each having an emitter, base and collector, the first and second transistors being connected as a differential amplifier so that the emitters thereof have a common connection, a DC path including a first impedance element between the common connection and a DC reference potential, means for only AC coupling the burst signal to the base of one of the transistors of the differential amplifier, a load impedance connected between the collector of one of the transistors of the differential amplifier and a DC power supply terminal at a DC potential higher than the reference potential, a first DC bias connection between the emitter of the third transistor and the base of one of the transistors of the differential amplifier, a second DC bias connection between the emitter of the fourth transistor and the base of the other transistor of the differential amplifier, and means for supplying DC energizing potentials to the emitter collector paths of all of said transistors, means for supplying different DC forward bias voltages to the bases of the third and fourth transistors, the DC forward bias voltages differing from each other by an amount equal to the predetermined voltage plus a predetermined value, the predetermined value being less than the maximum voltage difference between the bases of the first and second transistors which is required to enable both of the first and second transistors to conduct simultaneously for normal operating temperature of the receiver so that, even if the variations in the normal operating temperature of the receiver occur, current flows in the load impedance when the peak to peak value exceeds the predetermined level to provide amplification of the AC component and tendencies of the differential amplifier to prevent amplification of the AC component when the burst signal exceeds the predetermined voltage when the temperature variations occur are overcome, the DC bias connections between the emitters and bases of the first, second, third and fourth transistors and the value of the differing DC forward bias voltages being such that the maximum peak value of the burst signal is clamped to the transistor emitter having the DC bias connection to the base of the transistor of the differential amplifier to which the burst signal is AC coupled.

15. A circuit for amplifying an AC component of an input waveform only in response to the AC component having a peak to peak variation greater than a predetermined level, said circuit amplifying said component despite variations of circuit parameters due to semiconductor elements of the circuit being subject to relatively wide temperature variations, comprising first, and second like conductivity type transistors each having an emitter, base and collector, the first and second transistors being connected as a differential amplifier so that the emitters thereof have a common connection, a DC path including a first impedance element between the common connection and a DC reference potential, means for only AC coupling the waveform to the base of one of the transistors of the differential amplifier, a load impedance connected between the collector of one of the transistors of the differential amplifier and a DC power supply terminal at a DC potential higher than the reference potential, a first DC bias connection for the base of one of the transistors of the differential amplifier, a second DC bias connection for the base of the other transistor of the differential amplifier, and means for supplying DC energizing potentials to the emitter collector paths of both of said transistors, said first and second bias connections including means for supplying different DC forward bias voltages to the bases of the first and second transistors, the DC forward bias voltages differing from each other by an amount equal to the predetermined level plus a predetermined value, the predetermined value being less than the maximum voltage differences between the bases of the first and second transistors which is required to enable both of the first and second transistors to conduct simultaneously for normal operating temperature of the circuit so that, even if the variations in the normal operating temperature of the circuit occur, current flows in the load impedance when the peak to peak variation exceeds the predetermined level to provide amplification of the AC component and tendencies of the differential amplifier to prevent amplification of the AC component when the variation exceeds the predetermined level when the temperature variations occur are overcome.

16. An automatic chrominance control circuit for a domestic color television receiver subject to normal temperature variations in a domestic environment, said circuit comprising:

(a) a gain controllable amplifier responsive to a chrominance signal;

(b) a burst signal gate circuit for separating a burst signal from the output signal of said gain controllable amplifier in response to a burst gate signal;

(c) an amplitude comparator for producing an output signal proportional to the difference between the peak to peak value of said burst signal and a predetermined voltage only when the peak to peak value of said burst signal is over a predetermined voltage, said amplitude comparator including:

first and second like conductivity type transistors, each having an emitter, base and collector, the first and second transistors being connected as a differential amplifier so that the emitters thereof have a common connection, a DC path including a first impedance element between the common connection and a DC reference potential, means for only AC coupling the burst signal to the base of one of the transistors of the differential amplifier, a load impedance connected between the collector of one of the transistors of the differential amplifier and a DC power supply terminal at a DC potential higher than the reference potential, a first DC bias connection for the base of one of the transistors of the differential amplifier, a second DC bias connection for the base of the other transistor of the differential amplifier, and means for supplying DC energizing potentials to the emitter collector paths of both of said transistors, said first and second bias connections including means for supplying different DC forward bias voltages to the bases of the first and second transistors, the DC forward bias voltages differing from each other by an amount equal to the predetermined voltage plus a predetermined value, the predetermined value being less than the maximum voltage difference between the bases of the first and second transistors which is required to enable both of the first and second transistors to conduct simultaneously for normal operating temperature of the circuit so that, even if the variations in the normal operating temperature of the receiver occur, current flows in the load impedance when the peak to peak value exceeds the predetermined level to provide amplification of the AC component and tendencies of the differential amplifier to prevent amplification of the AC component when the burst signal exceeds the predetermined level when the temperature variations occur are overcome.

* * * * *